(12) United States Patent
Hopwood et al.

(10) Patent No.: US 6,268,731 B1
(45) Date of Patent: Jul. 31, 2001

(54) LOCATOR OF ELECTRICALLY CONDUCTIVE OBJECTS

(76) Inventors: Michael Peter Hopwood, The Old Post Office, St. James Road, Little Paxton, St. Neots, Cambridgeshire PE19 4QW; Nicholas James Frost, The Old Rising Sun, Thorney, Langport, Somerset TA10 ODR, both of (GB)

( * ) Notice: Subject to any disclaimer, the term of this patent is extended or adjusted under 35 U.S.C. 154(b) by 0 days.

(21) Appl. No.: 09/180,555
(22) PCT Filed: Feb. 25, 1998
(86) PCT No.: PCT/GB98/00586
§ 371 Date: Dec. 14, 1998
§ 102(e) Date: Dec. 14, 1998
(87) PCT Pub. No.: WO98/40764
PCT Pub. Date: Sep. 17, 1998

(30) Foreign Application Priority Data

Mar. 7, 1997 (GB) .................................... 9704729

(51) Int. Cl.$^7$ ................ G01V 3/06; G01V 3/11; G01V 3/08; G01R 33/02
(52) U.S. Cl. ............................. 324/326; 324/247
(58) Field of Search .................. 324/326, 327, 324/328, 329, 67, 247; 343/893; 342/465

(56) References Cited

U.S. PATENT DOCUMENTS

| 4,390,836 | 6/1983 | Bruce et al. . |
| 4,542,344 | 9/1985 | Darilek et al. . |
| 4,806,869 | 2/1989 | Chau et al. . |
| 5,920,194 | * | 7/1999 | Lewis et al. .......................... 324/326 |

FOREIGN PATENT DOCUMENTS

| 0 720 029 | 7/1996 | (EP) . |
| WO 92/06392 | 4/1992 | (WO) . |

* cited by examiner

Primary Examiner—Walter E. Snow
(74) Attorney, Agent, or Firm—Woodbridge & Associates, P.C.; Richard C. Woodbridge

(57) ABSTRACT

In order to locate an electrically conductive object, the electromagnetic field generated by a current in the object is detected by a detector having a plurality of spaced apart antennas. In order for the location of the object to be determined, two or more of the antennas together have at least four aerials, with first and second aerials measuring field components in a direction perpendicular to the direction of separation of the antennas, the third aerial measuring field components parallel to the direction of separation and the fourth aerial measuring field components in a direction mutually perpendicular to the field components measured by the first, second and third aerials.

10 Claims, 3 Drawing Sheets

LOCATOR OF ELECTRICALLY CONDUCTIVE OBJECTS

BACKGROUND OF THE INVENTION

1. Field of the Invention

The present invention relates to a locator for locating an electrically conductive object. It is particularly suitable for measuring the position and orientation of buried underground objects such as cables and pipes.

2. Summary of the Prior Art

There is currently an increasing proliferation of underground objects such as cabling, piping, ducting etc. carrying utilities such as gas, electricity and telephone lines. Consequently it has become critical that persons involved in e.g. excavation work are aware of the location of said objects before commencing work so that unnecessary expense and inconvenience are not incurred through accidental damage.

Thus a typical target object for a locator is a cable comprising a conductive component such as metal sheathing or wiring. An electromagnetic field susceptible of detection by a locator can be produced in such a cable by e.g. the application of a signal to the cable sheathing or wiring via a suitable transmitter, or an alternating current carried by the cable.

Buried fibre-optic communication systems have especially high costs associated with their damage because of the difficulty of repairing broken fibre-optic cables and the potentially large numbers of customers who may be inconvenienced by the damage. Fibre-optic cables however usually have a protective metal sheath which can be used to make them locatable as described above.

WO-A-95-30913 disclosed a locator in the form of a ground penetration probe which had spaced antennae within the probe, each of which antennae detected electromagnetic signals from a buried underground object, such as a cable. The electromagnetic signals from the antennae were analyzed to determine the separation of the locator and the objection in the direction of the spacing of the antennae, and also in the perpendicular direction. This enabled a display to show visually the separation of the locator and the object.

In the arrangement disclosed in WO-A-95-30913, the antennae had identical aerial arrays, the aerial arrays being formed by detection coils. Although it was possible for each antenna to have an array with one horizontal and one vertical coil, WO-A-95-30913 also disclosed arrangements in which each antenna had three mutually perpendicular coils to detect magnetic fields, one coil in the direction of the spacing of the antennae, and the other two in two mutually perpendicular directions.

SUMMARY OF THE INVENTION

The present invention is based on the realization that sufficient information can be derived from antennae which are not all identical. At its most general, therefore, the present invention proposes a locator with at least two spaced apart antennae, with those antennae having aerial arrangements which are not identical.

In deriving the position of a concealed object relative to the locator, an important measurement is the distance between the locator and the concealed object measured in the direction of elongation of the locator. This direction (hereinafter the X direction) is particularly important when the locator is a ground penetration probe.

Although the antennae used in the present invention are not all identical, they must, in total, provide sufficient different measurements of the electromagnetic field from the concealed object to enable the location of that concealed object to be determined. Therefore, the arrangement of the electromagnetic field detectors (aerials) of the antennae must satisfy certain minimum conditions. Thus, the two or more antennae for measuring electromagnetic fields together have at least four electromagnetic field detectors (aerials), of which the first and second aerials measure field components in a direction (the Y direction) perpendicular to the direction of separation of the first and second antennae. These components are then used to determine the separation of the antennae and the concealed object in a direction (the X direction) parallel to the direction of separation of the first and second antennae. The third aerial in the X direction measures components and the fourth aerial measures components in a direction (the Z direction) mutually perpendicular to the X and Y directions. The aerials are distributed amongst the antennae so that at least one antenna measures a component direction not measured by at least one of the other antennae. Suitable processing means uses the differences between (and sometimes the absolute values of) the measurements made by the aerials to derive positional and orientation information of a target object with respect to the locator.

An advantage of arrangements according to the present invention is that a simpler locator having fewer aerials may be provided, but the locator is nonetheless able to supply an operator with similar direction, distance, and orientation information available to an operator of the locator of WO-A-95-30913. Thus information can be supplied which is similar to the information supplied by the embodiment of the locator of WO-A-95-30913 but with a locator having only four aerials.

Normally, the antennae will be located within a housing locator so that one antenna is near an end of the locator, and the other antennae are then spaced apart within that housing. The locator will then be used with the one antenna near an end thereof preferably being an end which is bought closest to the concealed object. That one antenna will therefore detect the strongest signals and thus it is preferable that one antenna is formed by the first and third aerials referred to earlier. This means that the measurement in the Y direction, and one of the measurements in the X direction are based on the strongest fields detected by the locator.

The second aerial is then in a second antenna spaced from the first in the X direction. It would also be possible for the fourth aerial to be included in the second antenna, or even in the first, but it is preferable that it is part of the third antenna, and that third antenna is located between the first and second antennae, with all three antennae sharing a common axis.

In a further development the second antenna comprises the second and a fifth aerial, the fifth aerial being able to measure field components in the X direction. The measurement by the locator of an additional X component may be used by the processing means to supplement the positional and orientation calculations described above. However, it is often the case, especially in urban situations, that the electromagnetic field produced by an object is distorted by fields produced by other conducting objects, such as parallel cables. When this occurs, X component amplitude and phase information measured by the third and fifth aerials may be used by an appropriately configured processing means to compensate for the distortion.

Common mode interference can also be a problem during electromagnetic detection. This occurs when electromagnetic signals are received not only from the object but also from sources such as a transmitter or adjacent metalwork. Therefore, in another development the third antenna comprises the fourth and a sixth aerial, the sixth aerial being able to measure field components in the Y direction. Having a third Y component measurement can enable the processing means (again appropriately configured) to detect and compensate for common mode interference.

A type of aerial suitable for the purposes of our proposal is a coil aerial. When an electromagnetic field passes through such a coil, the axis of the coil is the direction of the field component measured by the aerial. However the shapes and dimensions of suitable coils may be various.

Typically the antennae are arranged along a receiver which may be in the shape of a blade lying substantially in a plane containing the X and Y directions. Where the locator is a hand-held device, the proximal end of the receiver is normally attached to one end of the locator body, the body having a handle at the other end. The first antenna will then usually be located towards the distal end of the receiver.

When locating e.g. underground cables with a hand-held device, the operator holds the locator so that the receiver points downwardly. By swinging the receiver to the left and right (in the X–Y plane of a blade receiver) as he walks he may follow the line of a cable, being guided by indicia controlled by output from the processing means. The indicia may be representations on a LCD screen and/or an audio signal emitted by a speaker.

BRIEF DESCRIPTION OF THE DRAWINGS

Embodiments of the proposal are now described in detail, by way of example, with reference to the following figures in which.

DETAILED DESCRIPTION

As described above, a basic operating principle of the locator is that by displacing and rotating the locator an operator can use measurements derived from signals detected by the aerials to establish the position and orientation of a conductive object, a typical object being a buried underground cable.

Figure 1:
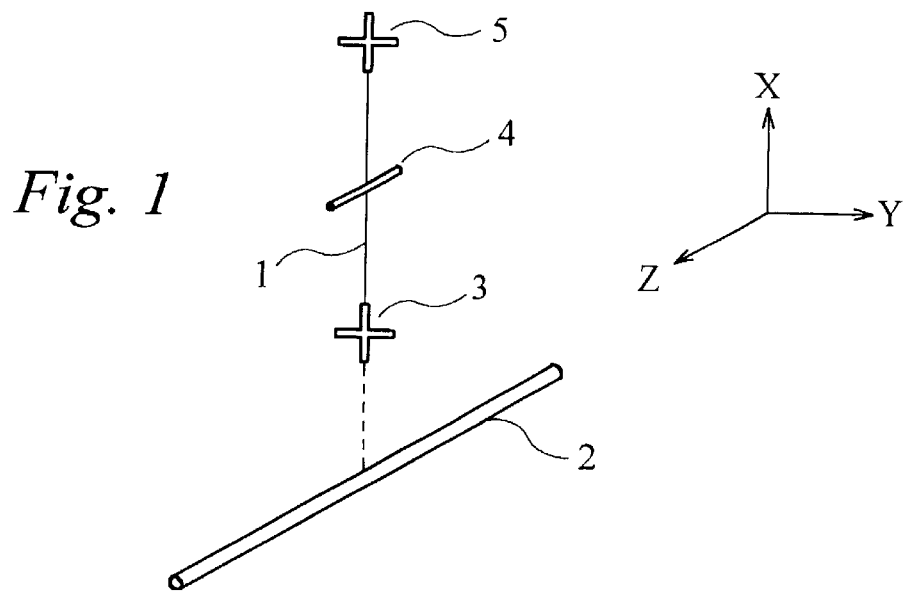
FIG. 1 is a schematic view of the relationship between three antennae and a cable target object, FIG. 2 corresponds to FIG. 1 but shows only the X–Y plane.

In a first embodiment, shown in FIG. 1, the locator has three antennae arranged along an axis 1 corresponding to the X direction. The antennae will be located in housing (not shown in FIG. 1), which housing will be orientated so that a first one of the antennae is closest to the expected position of an underground cable 2 which is to be located. The first antenna 3 has two aerials which measure field components in the X and Y directions respectively. The second antenna 5, which is the antenna furthest from the first antenna, also has two aerials which measure components in the X and Y directions respectively. The third antenna 4, located midway between the first two antennae, has a single aerial which measures components in the Z direction.

Figure 2:
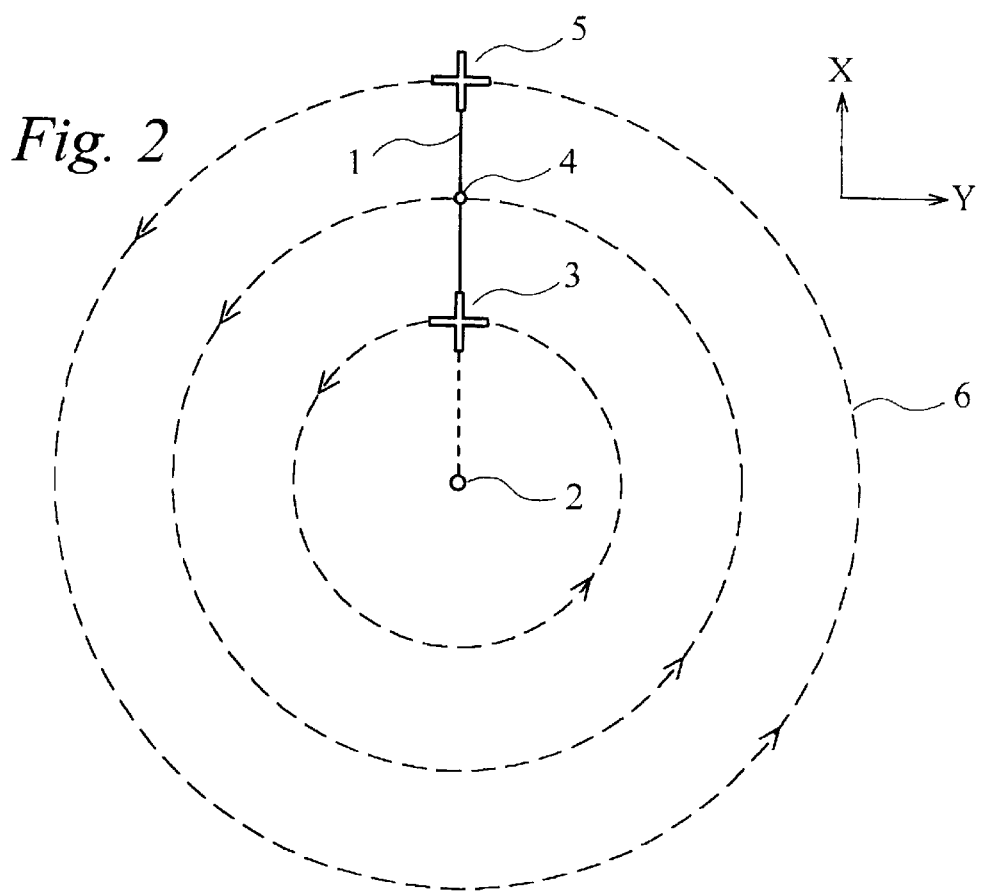

When a cable 2 carries a current, it produces an axisymmetric electromagnetic field 6 as shown schematically in FIG. 2. An aim of the operator is to arrive at a situation whereby the locator is positioned so that its axis 1 is perpendicular and directed towards the cable, and the cable direction corresponds to the Z direction. When this occurs, the Y components measured by the first 3 and second 5 antennae will be maximized (for a given distance of the locator from the cable) and the X components measured by the first 3 and second 5 antennae will be zero, as will the Z component measured by the third antenna 4. Furthermore, the relative strengths of the Y components measured at the first and second antennae can be used by the processing means to calculate the distance of the cable from the locator. Thus when the locator is in this situation, the operator knows the direction, distance and orientation of the cable with respect to the locator.

The operator may be guided towards the above situation by measurement signals from the antennae when the locator is displaced or rotated with respect to the cable.

Figure 3:
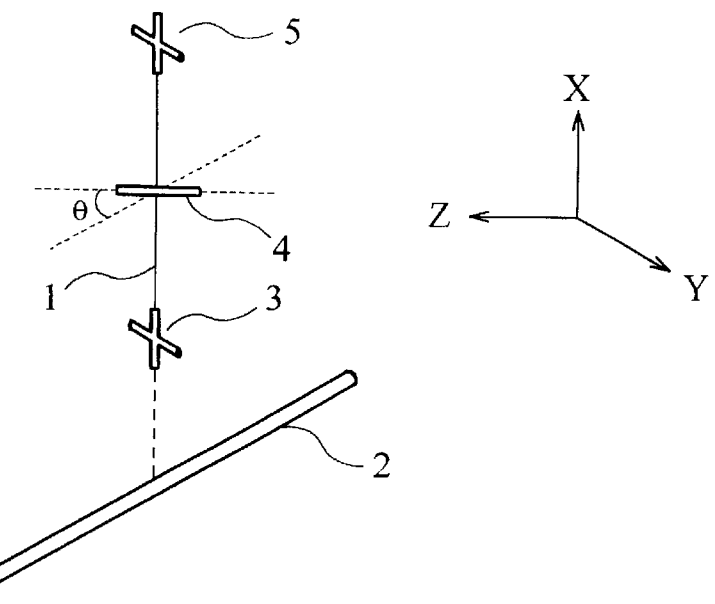
FIG. 3 shows the antennae of FIG. 1 rotated by an angle e about their common axis.

Thus if, with respect to the above situation, the locator has undergone a rotation θ about its axis 1 (as shown in FIG. 3) the strength of the Y components measured by the first 3 and second 5 antennae will be reduced while the Z component measured by the third antenna 4 will be increased. This information can be used by the processing means to calculate the angular displacement θ of the cable 2 about the axis.

Figure 4:
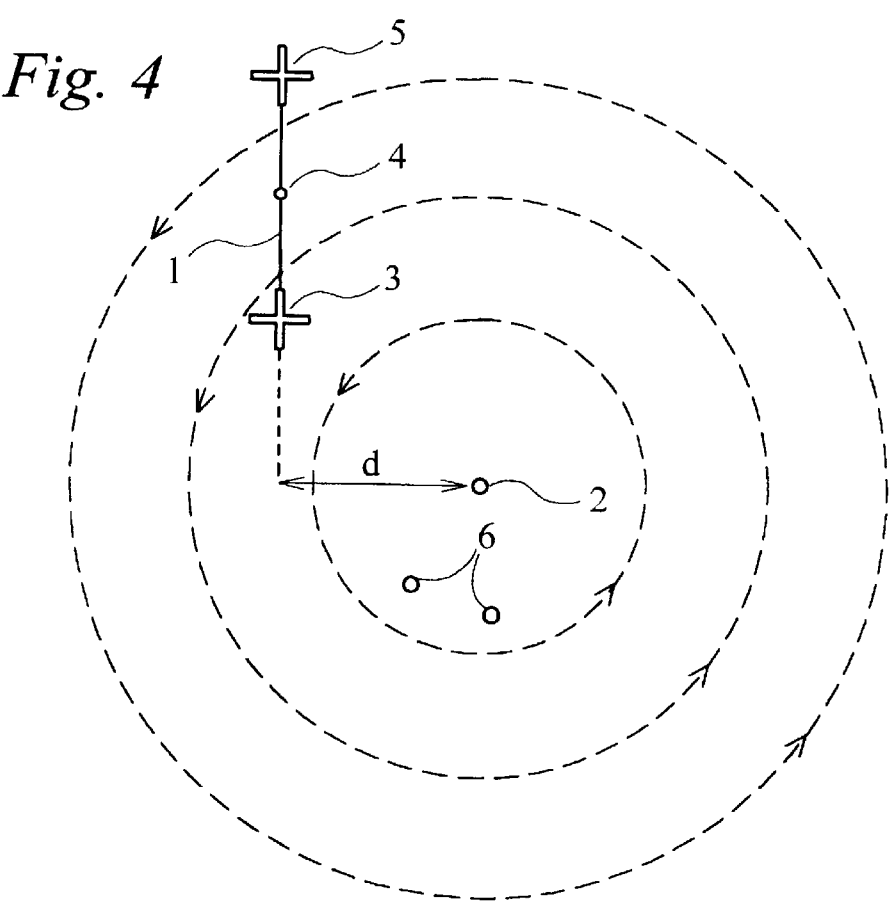
FIG. 4 shows the antennae of FIG. 2 offset by a distance d in the Y direction.

Furthermore if the locator has been offset by an amount d from the situation described above in a direction perpendicular to the cable 2 (as shown in FIG. 4), the two Y component measurements will be reduced while the X components measured by the first 3 and second 5 antennae will be increased. This information can be used by the processing means to calculate the amount of offset d, in a similar way to that described in WO-A-95-30913.

Often there are other cables 6 (as shown in FIG. 4) in the proximity of the object cable which may cause field distortion. It may then no longer be reasonable to assume an axisymmetric field centred on the object cable. The primary purpose of the X aerial in the second antenna is then to permit the processing means to compensate for the distortion.

Where the aerials are coil aerials, the axes of the coils need not be centrally coincident within each antenna. WO-95-30913 also describes calculations that may be performed by the processing means to compensate for deviations from centrality of the coils of the antennae.

Figure 5:
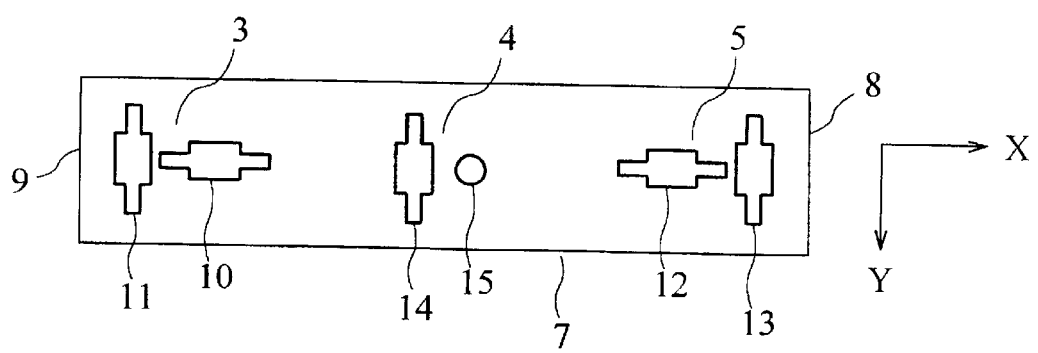
FIG. 5 shows a schematic blade-shaped receiver.

A schematic of a blade-shaped receiver 7 being a second embodiment of the present invention is shown in FIG. 5. This receiver permits a locator to be operated as described above, but compared with the first embodiment it has an additional aerial coil located in the third antenna for measuring Y field components. As mentioned earlier, this permits the locator to compensate for common mode interference.

The receiver 7 has proximal 8 and distal 9 ends with respect to a locator body to which it can be attached. The first antenna 3, located towards the distal end of the receiver, has X 10 and Y 11 component coils; the second antenna 5, located towards the proximal end of the receiver, also has X 12 and Y 13 component coils; and the third antenna 4, located midway between the first two, has Y 14 and Z 15 component coils. The X and Y component coils all have their coil axes in the plan of the blade, while the Z component coil has its axis perpendicular to the blade (i.e. out of the paper). The X and Y component coils are approximately 100 mm long and approximately 25 mm in diameter at their widest points. The Z component coil is also approximately 25 mm in diameter but is, however, only approximately 25 mm long. The blade includes a housing (not shown) which covers and protects the antennae.

In a further embodiment the locator displays on a screen, such as a LCD, the X and Y displacements of the object with respect to the distal tip of the receiver and/or the angle θ. The display may be alphanumeric and/or graphic. However, displacement and angular information may also be presented by an audio signal. Thus the locator may comprise a speaker which emits an audio tone of varying pitch dependent upon the displacement d or upon the angle θ. In an embodiment comprising both visual and audio indicia the operator may follow the line of a cable by walking at a moderate pace and swinging the receiver blade from side to side (in the X–Y plane) while watching the display and listening to the audio tone.

Wear of the receiver, especially of the distal end, may be a problem because of the many opportunities the receiver has to brush against the ground during normal usage. Therefore the receiver may have a replaceable wear boot which can be detached from the receiver after excessive wear has occurred and replaced with another.

The locator includes processing means which process the signals produced by the aerials and perform the calculations described above. WO-95-30913 describes a method of accomplishing the signal processing which includes the use of an amplifier. The embodiments of the present invention described above may have a manual controller, e.g. a paddle, to control the amplifier gain. In this way, if the signals produced by the aerials vary for any reason (e.g. because a cable is momentarily shielded by another object and the electromagnetic field is weakened), the operator can manually adjust the gain to compensate.

The locator may also have a key pad which may be used to e.g. control operating modes or program the processing means. The key pad may be adjacent the display screen, or optionally may be detachable and reachable, in which case it may communicate with the processing means via e.g. an infra red link. The processing means may also be programmable via a feature card which can also be used to control the operating mode of the locator.

What is claimed is:

1. A locator for an electrically conducting underground object which generates an alternating electromagnetic field, said locator having first, second and third spaced apart antennas and processing means, first, second, third and fourth electromagnetic field detectors, the first and second field detectors measure electromagnetic field components in a direction perpendicular to the direction of separation of the first and second antennas, the third field detector measures the electromagnetic field components parallel to the direction of separation of the first and second antennas, and the fourth field detector measures the electromagnetic field components in a direction mutually perpendicular to the directions of the electromagnetic field components measured by the first, second and third detectors; and the first antenna is formed by said first and third electromagnetic field detectors, the second antenna is formed by the second electromagnetic field detector, and the third antenna is formed by the fourth electromagnetic field detector, and at least one of said antennas measures an electromagnetic field component in a direction not measured by at least one of the other antennas.

2. A locator according to claim 1, wherein the third antenna is located between the first and second antennas, and said first, second and third antennas share a common axis.

3. A locator according to claim 2, wherein the second antenna includes a fifth electromagnetic field detector, said fifth electromagnetic field detector measuring electromagnetic field components parallel to the direction of separation of the first and second antennae.

4. A locator according to claim 3 wherein the third antenna includes a sixth electromagnetic field detector, said sixth electromagnetic field detector measuring electromagnetic field components in the direction perpendicular to the direction of separation of the first and second antennas.

5. A detector according to claim 1 in which the antennae are arranged along a receiver which is in the shape of a blade lying substantially in a plane defined by the directions parallel to separation of the antennae, and perpendicular to the direction of separation of the antennae.

6. A method of locating an electrically conducting underground object, comprising applying an alternating magnetic field to said object, and locating said object using a locator according to claim 1.

7. A method according to claim 6, wherein the third antenna is located between the first and second antennae, and said first, second and third antennae share a common axis.

8. The method of claim 7, wherein the second antenna includes a fifth electromagnetic field detector, said fifth electromagnetic field detector measures electromagnetic field components parallel to the direction of separation of the first and second antennae.

9. The method of claim 8, wherein the third antenna includes a sixth electromagnetic field detector, said sixth electromagnetic field detector measures electromagnetic field components in the direction perpendicular to the direction of separation of the first and second antennae.

10. The method of claim 6, in which the antennae are arranged along a receiver which is in the shape of a blade lying substantially in a plane defined by the directions parallel to separation of the antennae, and perpendicular to the direction of separation of the antennae:

said method further including the additional step of holding the locator by an operator so that the receiver points downwardly and swinging the receiver back and forth along the plane of said blade of the receiver as the operator moves in a given direction.

* * * * *

UNITED STATES PATENT AND TRADEMARK OFFICE
CERTIFICATE OF CORRECTION

PATENT NO. : 6,268,731 B1
DATED : July 31, 2001
INVENTOR(S) : Michael Peter Hopwood et al.

It is certified that error appears in the above-identified patent and that said Letters Patent is hereby corrected as shown below:

<u>Title page,</u>
Insert Item -- [73] Assignee: Radiodetection Limited --.

Signed and Sealed this

Twenty-third Day of September, 2003

JAMES E. ROGAN
*Director of the United States Patent and Trademark Office*